United States Patent [19]

Almagro

[11] 4,155,769

[45] May 22, 1979

[54] NON-SETTLING COATING COMPOSITION AND FLATTING PIGMENT

[75] Inventor: Guillermo A. Almagro, Havre de Grace, Md.

[73] Assignee: J. M. Huber Corporation, Locust, N.J.

[21] Appl. No.: 851,551

[22] Filed: Nov. 14, 1977

[51] Int. Cl.$^2$ .................................................. C08K 3/36
[52] U.S. Cl. ............................ 106/193 J; 106/288 B; 106/195; 428/402
[58] Field of Search ................... 106/288 B, 204, 309, 106/193 J, 193 R; 428/402; 423/339

[56] References Cited

U.S. PATENT DOCUMENTS

| 2,717,214 | 9/1955 | Marotta et al. | 106/193 J |
| 2,805,956 | 9/1957 | Pechukas | 106/288 B |
| 2,838,413 | 6/1958 | Young | 106/308 M |
| 3,499,778 | 3/1970 | Cain, Jr. et al. | 106/288 B |

*Primary Examiner*—Patrick Garvin
*Assistant Examiner*—J. V. Howard
*Attorney, Agent, or Firm*—Harold H. Flanders; Ernest A. Schaal

[57] ABSTRACT

A coating composition such as nitrocellulose lacquer or varnish incorporates a flatting pigment having non-settling properties obtained by grinding a dried precipitated hydrated silica and calcining it at a temperature between 400° C. and 600° C. so that the pigment consists of particles smaller than 10 microns in size having a bound water content below 2%. The calcination may be effected before or after the grinding. Advantageously, a wet precipitated hydrated silica is spray-dried to about 12% or less total moisture; the dried hydrated silica is milled and air classified to obtain material consisting entirely of particles smaller than 10 microns in size; and these particles are calcined at a temperature between 450° C. and 550° C. The pigment product so obtained exhibits outstanding non-settling flatting characteristics in nitrocellulose lacquer.

5 Claims, 1 Drawing Figure

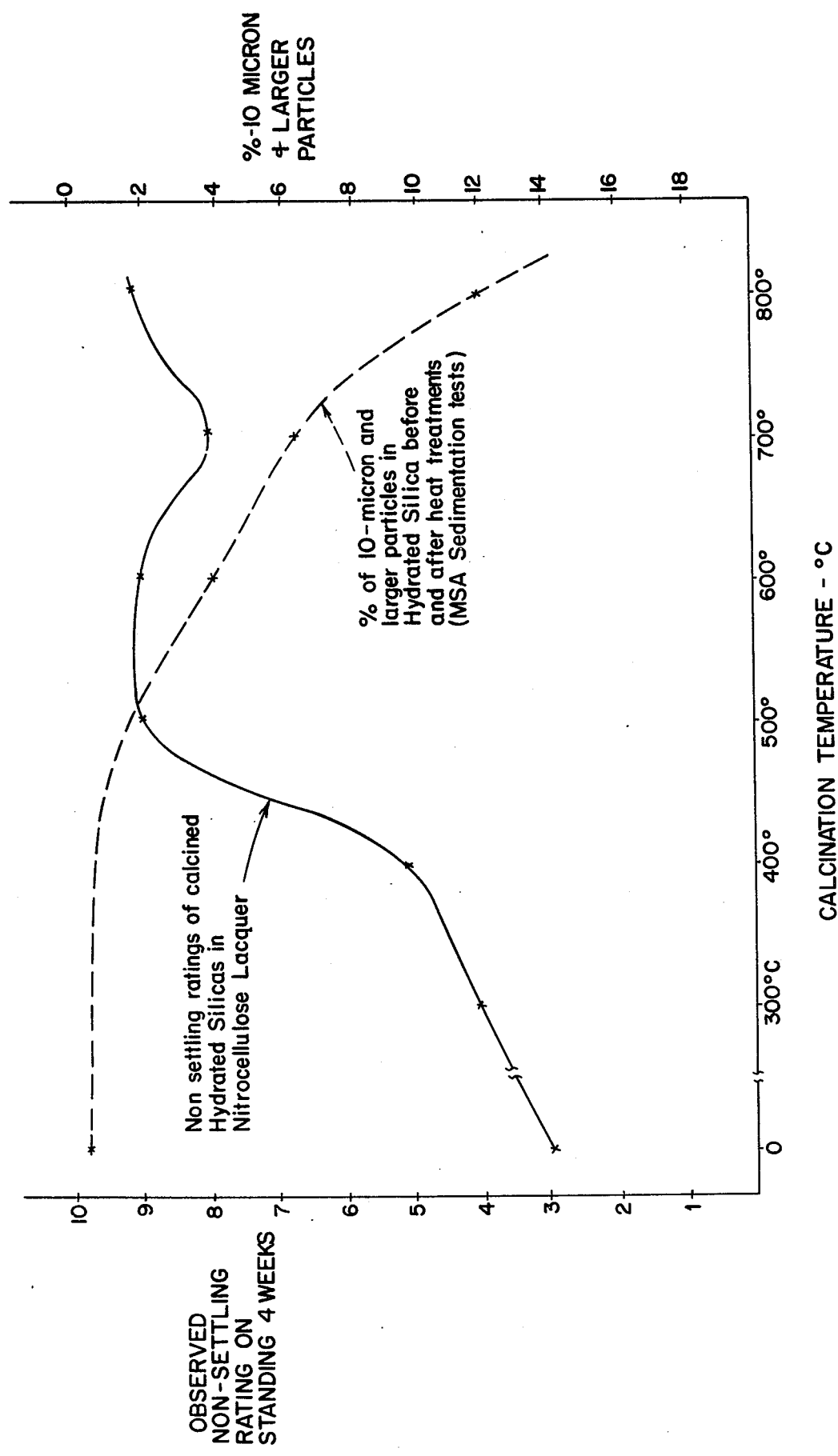

NON-SETTLING COATING COMPOSITION AND FLATTING PIGMENT

FIELD OF THE INVENTION

This invention relates to coating compositions, such as nitrocellulose lacquer and varnishes, containing a non-settling silica flatting pigment and to a method of preparing such a pigment and the non-settling flatting pigment.

The high gloss appearance resulting from the application of clear varnish or lacquer finishes to furniture and other products is frequently undesirable. For example, in the furniture industry, a high gloss finish is associated with an inexpensive product since furniture with a dull satin finish gives a rich appearance. Hand rubbing operations to obtain a dull and flat surface are expensive and time consuming. Hence, a flatting agent is often incorporated into the varnish or lacquer. Flatting agents are also used in other coating compositions, for example, in compositions for coating textile materials, such as those employed in upholstery, and compositions for coating metal surfaces, for instance automobile dashboards, to reduce glare.

Hydrated silica is known to be effective as a flatting pigment in nitrocellulose lacquer. The known hydrated silica flatting agents, however, are objectionable in that they have a tendency to settle and cake at the bottom of the lacquer on standing. Before the lacquer can be used, the settled material must be redispersed throughout the lacquer. Redispersion is often difficult and sometimes impossible due to a hard caking of the settled material. Consequently, when using known silica flatting pigments, the shelf life of a lacquer or varnish may be quite short.

DESCRIPTION OF PRIOR ART

The prior art includes various proposals for overcoming the settling problems of silica flatting agents in lacquer. U.S. Pat. No. 2,625,492 discloses a method wherein silicon dioxide hydrogel is treated with ammonia, and with a soluble inorganic fluorine compound. The hydrogel is then dried, activated by calcination at high temperatures, and ground to form a silica flatting agent having non-hard-settling properties. Such a method involves the drawbacks of disposing of fluorine-containing substances and using toxic substances such as ammonium chloride, also the corrosive effects of fluorine compounds in equipment.

U.S. Pat. No. 3,148,026 discloses a process by which all the free water and bound water is to be removed from hydrated silica pigment to improve its dispersion characteristics. The pigment is coated with an organic nitrogen-containing compound, then is heated in the presence of free oxygen to the inflammation point of the coating, to burn it explosively, and thereafter is heated in air to between 600° C. and 800° C. Thus, the process involves coating and chemical treatments of the hydrated silica and requires the special equipment necessary to effect such treatments.

Another technique for improving non-settling properties of silica pigment involves coating the silica with a high melting point wax to avoid formation of hydrogen bonding between the polar solvent in the lacquer and hydroxyl or silanol groups in the hydrated silica. This, however, also requires a coating treatment with the disadvantage that the wax decreases the mar resistance of the finish, and special equipment to handle the wax component is required.

U.S. Pat. No. 2,588,853, relating to the preparation of amorphous silica powder useful as a flatting agent, states that silica gels differ a great deal in their specific properties. In "Rubber Reviews for 1976", *Rubber Chemistry and Technology*, Vol. 49 (July–August 1976), pp. 704 ff, it is stated that the fundamental properties which determine the silica appropriate to an end use are particle size and extent of hydration.

Silica materials for catalytic and adsorbent purposes have been dehydrated to remove moisture and calcined at high temperature for activation. It appears from U.S. Pat. No. 3,148,026 that hydrated silica pigments have been dehydrated by thermal treatment at temperatures ranging from 150° C. to approximately 900° C., and that such treatment results disadvantageously in the formation of pigment agglomerates.

SUMMARY OF THE INVENTION

It is a principal object of the present invention to provide a nitrocellulose lacquer, varnish or similar coating composition containing a silicon dioxide flatting pigment having remarkably improved non-settling properties, and which, if settled out at all by prolonged standing, is readily redispersible in the liquid of the composition.

Another object of the invention is to provide a method of producing such a flatting pigment, and the pigment so produced.

The present invention overcomes deficiencies of the prior art techniques which require chemical or coating treatment by other substances for obtaining a non-settling flatting pigment, and provides a coating composition which incorporates a highly effective non-settling silica flatting pigment obtained by an economical method. This is achieved, according to the invention, by calcining hydrated silica pigment at a temperature between 400° and 600° C., thus reducing the bound water content from a normal amount of at least 4% by weight to below 2%, and providing the calcined silica with substantially all of its particles smaller than 10 microns in size. The dehydrated hydrated silica so obtained has been found to serve excellently as a non-settling flatting pigment in nitrocellulose lacquer and other film forming liquid compositions that normally form glossy coatings. Advantageously, the starting hydrated silica is precipitated silica that has been prepared in known manner by acidulation of an aqueous silicate solution and has been dried and ground, or ground and classified, before the calcination so as to have only particle sizes smaller than 10 microns.

Moisture is present in hydrated silica as free moisture, that is water which is held loosely on, in or among the particles, and as bound water which is water considered physically or chemically bound or combined. Free moisture is considered removed when the material is heated at 105° C. for 2 hours; while bound water is considered water which is removed, after the removal of free moisture, by further heating at 900° C. for 2 hours. The water removed by heating from 105° C. to 900° C. for 2 hours is also referred to as loss on ignition. Hereinafter, the sum of free moisture and bound water will be referred to as total moisture, which is the amount of moisture removed by heating the material from ambient temperature for 2 hours at 900° C.

Other objects, features and advantages of the invention will be evident from the following description of preferred embodiments thereof and from the accompanying drawing.

BRIEF DESCRIPTION OF DRAWING

The drawing illustrates results of the invention by a graphical representation of non-settling properties in nitrocellulose lacquer of silicas obtained by calcinations of a hydrated silica pigment at various temperatures. A graphical representation is also given, based on MSA sedimentation data, of particle agglomerating effects of heat treatments of a hydrated silica pigment at high temperatures.

DESCRIPTION OF PREFERRED EMBODIMENTS

A precipitated hydrated silica consisting essentially of finely divided hydrated silicon dioxide particulates is prepared in known manner by the acidulation of an aqueous silicate solution with an acid, such as sulfuric acid. The resulting slurry of precipitated hydrated silica is filtered, and the precipitate is washed and then dried until its total moisture content is below 12%. (A total moisture content of 12% is made up typically of approximately 5% of free moisture and approximately 7% of bound water.) The dried hydrated silica, either before or after but preferably after being ground or ground and classified to assure that all of the particles are below 10 microns in size, is calcined at a temperature between 400° C. to 600° C. Thus, a dehydrated silica flatting pigment is obtained which consists of calcined hydrated silica particles having particle sizes below 10 microns and a bound water content below 2%.

In a preferred embodiment of the invention, the washed precipitated hydrated silica is dried in a spray dryer, reducing the total moisture content below 12%; the dried material is ground, as in a Raymond mill, and air classified to obtain a fine hydrated silica consisting of particles which are all below 10 microns in size; the fine material is calcined at a temperature between 450° C. and 550° C., reducing its bound water content to below 2% while retaining the required fineness of particle sizes; and the resultant dehydrated silica is packaged in moisture proof containers, such as plastic-lined bags, to avoid re-absorption of moisture before use.

Upon the occasion for its use, the calcined hydrated silica pigment is dispersed in the liquid coating composition to be flatted, which typically is a common nitrocellulose lacquer, and an excellently flatted composition is obtained from which no objectionable settling of the pigment occurs even when the composition stands still for months.

The drying of the precipitated hydrated silica can be effected by any conventional means that will reduce the total moisture content to below 12%. A spray dryer preferably is used but the drying may also be performed in a rotary kiln or a fluidized bed, or by other conventional means. Similarly, although it is preferred to grind the dried hydrated silica in a Raymond mill and to use an air classifier for collecting a material consisting entirely of particles below 10 microns in size, other known means may be used as well, such for example as a jet mill or a Micronizer, for obtaining the silica with particles which all are below 10 microns in size.

The calcination of the hydrated silica can be effected in an oven, a rotary kiln, or any other suitable calcining apparatus. A calcination temperature of about 450° to 550° C. has been found most advantageous, as the silica so obtained is substantially free of objectionable agglomerates larger than 10 microns in size, which if present in a lacquer would show up as grit in a drawdown of the lacquer. The temperature range can be as wide as about 400° C. to 600° C., but temperatures above 600° C. result in objectionable agglomerates which are difficult to break up, while temperatures below 400° C. do not give an adequate improvement of non-settling properties.

As little as 2.8 percent by weight of the calcined hydrated silica flatting pigment dispersed in nitrocellulose lacquer will appreciably reduce the gloss of coatings formed by the lacquer. Larger amounts of the pigment up to about 3 to 4 percent maximize the flatting effect. These and still larger amounts can be employed to obtain lacquers which exhibit excellent flatness of finish and from which no troublesome settling of the pigment will occur during months of standing of the lacquer. The pigment is similarly effective in other film forming liquid compositions which normally form glossy coatings, such as varnishes and certain paints and resin solutions.

The following examples further illustrate the practice of the invention.

EXAMPLE I

Preparation of a precipitated hydrated silica

A concentrated sodium silicate solution of 38.2% solids content having a composition of 10.7% $NA_2O$ with 27.5% $SiO_2$ was diluted with sufficient water to provide a sodium silicate solution containing 3.78% $Na_2O$ with 9.52% $SiO_2$. The specific gravity of this dilute solution was approximately 1.121.

A 93.0% commercial sulfuric acid was diluted with sufficient water to provide a dilute sulfuric acid solution of 11.4% concentration having a specific gravity of 1.076 at 20° C.

The dilute sodium silicate and sulfuric acid solutions were used for preparing a precipitated hydrated silica pigment according to the following reaction procedure:

A quantity of the dilute sodium silicate solution, 2169 gallons, was introduced into a 6000 gallon stainless steel, steam jacketed reactor provided with agitators and was heated in the reactor to a temperature of 175°±2° F. Then the dilute sodium silicate and dilute acid were added simultaneously at the rates of 96.5±0.5 gallons of silicate solution per minute and 55.5±0.5 gallons of the acid per minute. The reaction temperature was maintained at 175°±2° F. The silicate flow was stopped after 27 minutes. The acid addition was continued until a final pH of 5.4–5.6 was obtained. Then the reaction slurry was digested at 199° F. for 10 minutes and the final pH was readjusted to 5.4–5.6.

The resulting slurry was filtered on a rotary vacuum filter. The filter cake was washed with water to free it from the reaction by-product (sodium sulfate), giving a moist precipitated hydrated silica which was spray dried to contain about 12% total moisture.

EXAMPLE II

A. Preparation of calcined precipitated hydrated silicas

The spray dried precipitated hydrated silica obtained as described in Example I was air milled in a Micronizer to bring all the particles to sizes below 10 microns. Then samples of the ground silica, each of about 100 grams, were calcined by heating them individually for two hours, with agitation about every half hour, in an oven at temperatures of 300°, 400°, 500°, 600°, 700° and 800°

C., respectively. The calcined hydrated silicas so obtained were then packaged separately in moisture proof plastic-lined containers.

B. Preparation and tests of pigmented lacquers

The six calcined hydrated silicas and a sample of the milled but not calcined hydrated silica were each tested for flatting and non-settling properties in nitrocellulose lacquer by preparing a lacquer pigmented with the silica and testing the lacquer. A 10 gram sample of each silica was dispersed in 350 grams of nitrocellulose lacquer (a product of Woodrow-Dare, Inc. designated Mil.-L-10287) by mixing the ingredients in a Waring blender for 3 minutes.

A portion of each pigmented lacquer was placed in a pint can and allowed to stand for four weeks, and checked visually for settling. Another portion of each lacquer was used to make a drawdown on a Leneta paper using a No. 34 wire wound draw bar. After the lacquer film on the paper had dried, gloss and sheen readings were taken from this drawdown by use of a Gardner Multiangle Glossmeter at an angle of 60° for gloss and at an angle of 85° for sheen. Each lacquer was also tested for a Hegman grind value, a standard measure in the paint industry of fineness of grind.

The results of the tests of the lacquer samples, designated lacquers 1 through 7, are shown in Table I and are illustrated graphically in the drawing.

TABLE I

| Effect On Settling And Flatting Properties Of Calcination Of Hydrated Silica At Various Temperatures | | | | | | | |
|---|---|---|---|---|---|---|---|
| Lacquer: | 1 | 2 | 3 | 4 | 5 | 6 | 7 |
| Silica Calcination temp., °C. | None | 300 | 400 | 500 | 600 | 700 | 800 |
| % Bound water | 4.7 | 3.8 | 3.0 | 1.4 | 1.5 | 0.6 | 0.7 |
| % Total Moisture | 11.3 | 5.5 | 4.1 | 2.2 | 2.3 | 0.9 | 1.4 |
| Hegman Grind | 5.8 | 5.8 | 5.5 | 5.5 | 5.8 | 5.8 | 0.0 |
| 60° Gloss/85° Sheen | 12/32 | 13/34 | 12/38 | 12/34 | 11/35 | 11/40 | 12/40 |
| Non-Settling rating, 4 wks. | 3 | 4 | 5 | 9 | 9 | 8 | 9 |

Non-settling rating:
9–10 = Excellent
6–8 = Good
5 = Fair
4 = Poor
3 = Bad

No objectionable settling was observed after 4 weeks of standing in the lacquers pigmented with the silicas calcined at the temperatures above 400° C., while the other lacquers showed bad to fair non-settling characteristics. The Hegman grind value of the lacquer pigmented with the silica calcined at 800° C. indicated grittiness which would make such silica unacceptable for most flatting purposes. Some grittiness, attributable to agglomerates in the silicas, was also observed in the lacquers pigmented with the silicas that were calcined at 600° C. and 700° C. Thus, for the purposes of the invention, the most effective calcining temperature lies between about 450° and 550° C., for instance at about 500° C.

EXAMPLE III

The procedures of Example II were repeated except that samples of the spray dried hydrated silica were first calcined at temperatures of 300°, 400°, 500° and 600° C., respectively, reducing their bound water content to less then 2%, and then were milled as in Example II to assure that all of the particles were below 10 microns in size. The nitrocellulose lacquers prepared with these silicas were tested for settling for four weeks. No settling was observed in the lacquers pigmented with the silicas calcined at 500° and 600° C., while the other lacquer samples showed objectionable settling.

EXAMPLE IV

The procedures of Example II were repeated except that the spray dried hydrated silica was milled in a Raymond mill and then air classified to obtain a material composed 100% of particles smaller than 10 microns in size. This material was subsequently calcined at 500° C. in an oven, giving a dehydrated silica containing less than 2% of bound water. No settling was observed in the nitrocellulose lacquer pigmented with this silica.

EXAMPLE V

A portion of each of the calcined silicas of Example II was rehydrated by placing it in a conditioning chamber at 75° F. and 100% relative humidity and keeping the material exposed to the humid atmosphere for about four days, until no further moisture pick-up occurred. The silicas so treated increased substantially in total moisture contents. They were then tested for settling in nitrocellulose lacquer in the manner of Example II.

In these tests, the rehydrated silicas that were not calcined or were calcined at 300° or 400° C. showed bad to poor non-settling properties, while these properties of the other rehydrated calcined silicas were good to excellent. Thus, it appears that the non-settling property of the calcined hydrated silica is related to its bound water content, which should be less than 2% and is affected relatively little by the free moisture content. Even so, it is desirable that the calcined silica be kept packed in moistureproof containers until removed for incorporation in the coating composition, as otherwise it would pick up moisture and carry free moisture objectionably into the coating composition.

From the foregoing description it will be apparent that highly stable non-settling flatted lacquers and the like can be provided by dispersing in the liquid coating composition a flatting pigment consisting essentially of calcined hydrated silica particles smaller than 10 microns in size and having a bound water content below 2% as obtained by calcination of the hydrated silica at a temperature between 400° and 600° C. Further, this non-settling flatting pigment is produced without any addition of fluorine-containing or nitrogen-containing compounds, waxes or other contaminants, and without need for special blending equipment.

While the invention has been described with reference to its preferred embodiments, it will be understood by those skilled in the art that various changes and substitutions may be made without departing from the teachings of the present disclosure or the scope of the invention as it is defined by the appended claims.

I claim:

1. In a coating composition comprising a nitrocellulose lacquer and a non-settling flatting pigment dispersed in said lacquer to give a flat finish to coatings formed by the lacquer, the improvement consisting of:
   said pigment being composed of a calcined precipitated hydrated silica in particles smaller than 10 microns in size containing less that 2% by weight of bound water.

2. A coating composition according to claim 1 wherein said silica has been calcined by heating at a temperature between 400° and 600° C. a precipitated hydrated silica having a bound water content of at least 4%.

3. A coating composition according to claim 2 wherein said silica has been calcined at a temperature between 450° and 550° C.

4. A coating composition according to claim 1 wherein said pigment is formed by:
   (a) drying wet precipitated hydrated silica to a total moisture content of about 12% or less,
   (b) grinding the dried silica to obtain material composed entirely of particles smaller than 10 microns in size; and
   (c) calcining said material at a temperature between 400° and 600° C.

5. A nitrocellulose lacquer composition that forms coatings having a dull flat finish, comprising a nitrocellulose lacquer having dispersed in it a non-settling flatting pigment composed of a calcined hydrated silica containing less than 2% by weight of bound water, said pigment having been prepared by:
   (a) grinding to particle sizes all of which are below 10 microns a precipitated hydrated silica pigment having a bound water content of at least 4%, and
   (b) calcining said ground pigment at a temperature between 400° and 600° C.

* * * * *